UNITED STATES PATENT OFFICE.

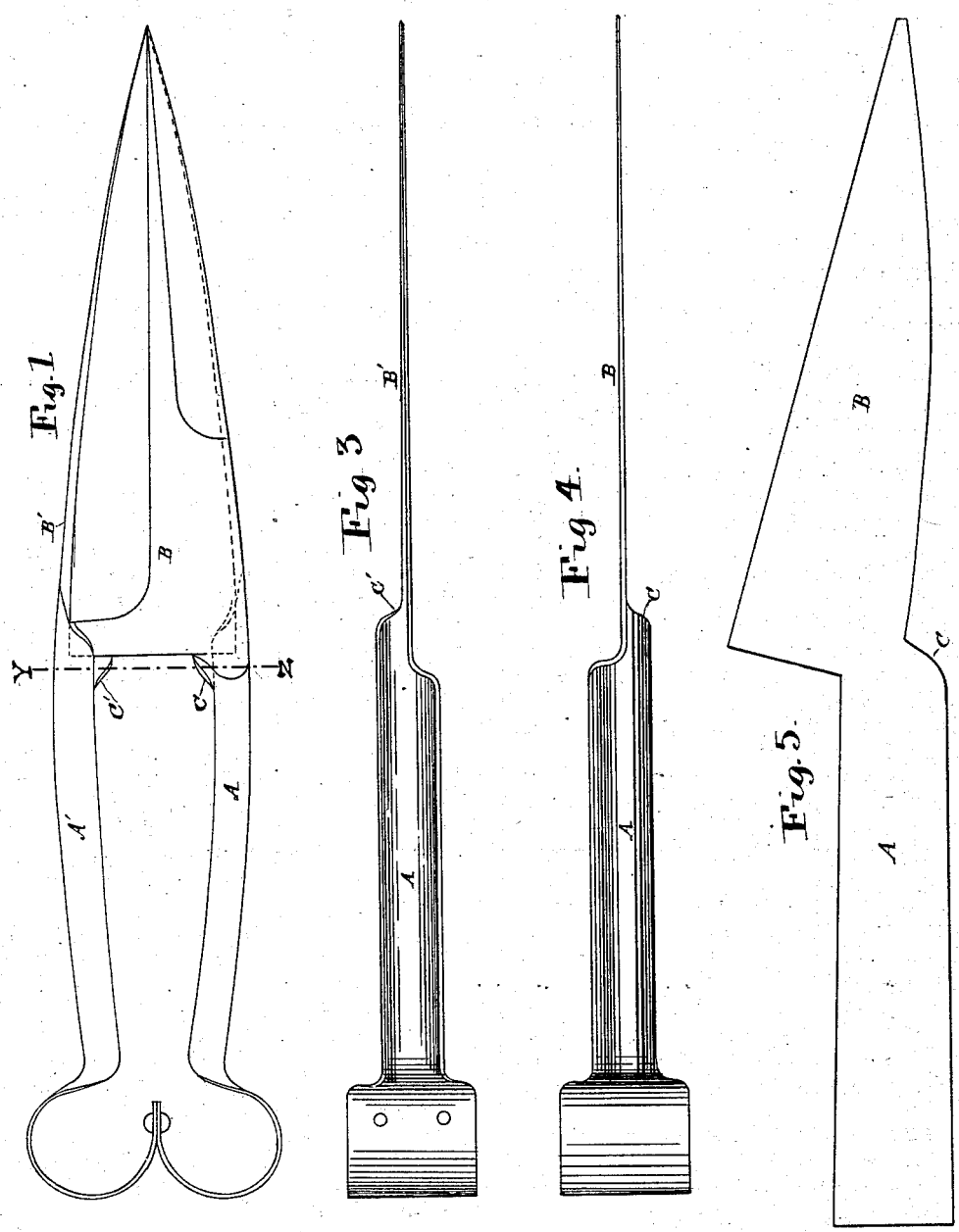

THOMAS BROWN, OF SHEFFIELD, COUNTY OF YORK, ENGLAND.

ANIMAL-SHEARS.

SPECIFICATION forming part of Letters Patent No. 315,237, dated April 7, 1885.

Application filed May 27, 1884. (No model.) Patented in England January 4, 1884, No. 693.

*To all whom it may concern:*

Be it known that I, THOMAS BROWN, of Sheffield, in the county of York, England, steel-manufacturer, a citizen of Great Britain, have invented a certain new and useful Improvement in Animal-Shears; that the same has not been patented to me or to others with my consent in any country except in Great Britain, dated 4th day of January, 1884, No. 693; and I do hereby declare that the following is a full, clear, and exact description of the said invention, which will enable others skilled in the art to which it appertains to make and use the same.

This invention relates to shears for shearing sheep and other animals.

Figure 1 is a front view. Fig. 2 is a transverse section as taken through the dotted line Y Z, Fig. 1, looking toward the blades. Fig. 3 is a plan or top view of the lower half of the pair of shears as seen in Fig. 1. Fig. 4 is a plan or top view of the upper half of the pair of shears as seen in Fig. 1. Fig. 5 is a plan of the "blank" from which the two halves of the shears are formed.

A is the shank. B is the blade. C is the guard of one half of the shears. A' is the shank. B' is the blade. C' is guard of the lower half of the pair of shears, as seen in Fig. 1.

As ordinarily made, the shank end of each blade is recessed and turned up to form a stop to prevent the blades closing too far, and the sharp edge of the shank end of one blade comes up to or near to the back of the opposite blade, causing injury to the hand of the operator. The shank of ordinary shears stops short at the blade.

In carrying my invention into effect the shanks A and A' are prolonged beyond the blades, and these prolongations form the combined guards and stops C C', the blade B being stopped by the prolongation C' of the shank A', and the blade B' being stopped by the prolongation C of the shank A. The aforesaid stops C C' are curved, so that each receives the corner of the edge of the opposite blade within its concavity, and not only acts as a stop for said blade, but also guards the hand of the person using the shears against being cut or scratched by said corner. It further prevents all risk of injury to the latter.

I am aware that it is not new to provide the opposite blades of shears with stops attached to their respective shanks and bent so as to come in contact with one another when the shears close for cutting. This construction I do not claim; nor do I claim the use of a stop which engages with the blade and stops it without guarding it or shielding the hand of the user; but,

Having thus described my invention, what I do claim as new, and desire to secure by Letters Patent, is—

A pair of shears consisting of a bow, two shanks attached thereto, two blades on said shanks, and two curved guards attached, respectively, to said shanks and forming parts thereof, each guard receiving in its concavity the corner of the opposite blade and shielding the shearer's hand from being injured thereby, besides acting as a stop for said blade, substantially as set forth.

THOMAS BROWN.

Witnesses:
E. EDWARD HEWETT,
WM. McGOWAN.